(12) United States Patent
Lee et al.

(10) Patent No.: US 9,581,776 B1
(45) Date of Patent: Feb. 28, 2017

(54) PHOTOELECTRIC CONVERSION MODULE

(71) Applicant: AQUAOPTICS CORP., Tainan (TW)

(72) Inventors: Tung-An Lee, Zhubei (TW); Chia-Chi Chang, Taipei (TW); Shih-Jye Yo, Zhubei (TW)

(73) Assignee: AQUAOPTICS CORP., Tainan (TW)

( * ) Notice: Subject to any disclaimer, the term of this patent is extended or adjusted under 35 U.S.C. 154(b) by 0 days.

(21) Appl. No.: 14/929,617

(22) Filed: Nov. 2, 2015

(30) Foreign Application Priority Data

Nov. 2, 2015 (TW) .............. 104136083 A

(51) Int. Cl.
| | |
|---|---|
| *G02B 6/12* | (2006.01) |
| *G02B 6/42* | (2006.01) |
| *G02B 6/32* | (2006.01) |
| *G02B 6/30* | (2006.01) |

(52) U.S. Cl.
CPC .............. *G02B 6/4292* (2013.01); *G02B 6/30* (2013.01); *G02B 6/32* (2013.01); *G02B 6/423* (2013.01); *G02B 6/4206* (2013.01); *G02B 6/428* (2013.01); *G02B 6/4214* (2013.01); *G02B 6/4243* (2013.01); *G02B 6/4257* (2013.01); *G02B 6/4295* (2013.01)

(58) Field of Classification Search
CPC .................. H01L 2924/00; H01L 2224/48091; G02B 6/43; G02B 6/4214; G02B 6/12004
See application file for complete search history.

(56) References Cited

U.S. PATENT DOCUMENTS

| | | | | |
|---|---|---|---|---|
| 8,548,288 | B2 * | 10/2013 | Raj ................... | G02B 6/12004 385/14 |
| 2008/0272282 | A1 * | 11/2008 | Blauvelt ............... | G02B 6/125 250/227.11 |

* cited by examiner

*Primary Examiner* — Jennifer Doan
(74) *Attorney, Agent, or Firm* — Chih Feng Yeh; Huntington IP Consulting Co., Ltd.

(57) ABSTRACT

A photoelectric conversion module is proposed. The photoelectric conversion module comprises two parts, interposer and optical bench. At least one optical element is configured on the interposer. The interposer is configured on a first concave portion of the optical bench. A first lens array is configured under the interposer to align the at least one optical element. A mirror is configured under the first lens array, with an optical micro-reflection surface. A second lens array is configured left side of the mirror.

20 Claims, 8 Drawing Sheets

PHOTOELECTRIC CONVERSION MODULE

TECHNICAL FIELD

The present invention relates to a photoelectric device, and more particularly, to a photoelectric conversion module to provide signal transmission and conversion between the optical devices and electrical devices.

BACKGROUND

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Typically, a typical multi-fiber optic connector includes a ferrule assembly supported at a distal end of a connector housing. The ferrule assembly can include a multi-fiber ferrule mounted in a hub. A spring is used to bias the ferrule assembly in a distal direction relative to the connector housing. The multi-fiber ferrule functions to support the end portions of multiple optical fibers. The multi-fiber ferrule has a distal end face at which polished ends of the optical fibers are located. When two multi-fiber optic connectors are interconnected, the distal end faces of the multi-fiber ferrules oppose and are biased toward one another by their respective springs. With the multi-fiber optic connectors connected, their respective optical fibers are coaxially aligned such that the end faces of the optical fibers directly oppose one another. In this way, optical signals can be transmitted from one optical fiber to another optical fiber through the aligned end faces of the optical fibers.

Systems for interconnecting optical fibers typically utilize mating ferrule assemblies to facilitate handling and accurate positioning of the fibers. The optical fibers are secured within a ferrule body, with an end surface of each fiber being positioned generally flush with or slightly protruding from an end face of the ferrule body. The end surfaces or faces of the fibers are then polished to a desired finish. When complementary ferrules assemblies are mated, each optical fiber of a ferrule assembly is coaxially positioned with a mating optical fiber of the other ferrule assembly. In some applications, the end faces of the mating optical fibers physically contact one another in order to effect signal transmission between the mating optical fiber pair. In such applications, various factors may reduce the efficiency of the light transmission between the optical fiber pair.

Consequently, optical technology plays a significant role in modern electronic devices, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

The use of the optical fibers requires photoelectric conversion modules to convert electrical signals to optical signals, or optical signals to electrical signals. Also, the photoelectric conversion modules are attached to be fixed to ends of the optical fibers, or to be attachable to or detachable from ends of the optical fibers.

SUMMARY OF THE INVENTION

In this invention, a photoelectric conversion module is proposed. The photoelectric conversion module comprises two parts, interposer and optical bench. At least one optical element is configured on the interposer. The interposer is configured on a first concave portion of the optical bench. A first lens array is configured under the interposer to align the at least one optical element. A mirror is configured under the first lens array, with an optical micro-reflection surface. A second lens array is configured left side of the mirror.

According to one aspect, the optical bench has a second concave portion for the second lens array formed thereon. The first lens array is formed on a bottom surface of the first concave portion. The arrangement orientation of the first lens array is the same as the second lens array. The first lens array, the second lens array and the mirror are embedded into the optical bench. A conductive trace is formed on the interposer to couple the at least one optical element.

According to another aspect, a photoelectric conversion module comprises an interposer with an optical waveguide portion and V-shape trench having a first optical micro-reflection surface and a second optical micro-reflection surface opposite to the first optical micro-reflection surface. An optical bench has a first concave portion for the interposer configured thereon. At least one optical element is configured on the interposer. At least one IC is optionally configured on the interposer to couple the conductive trace formed on the interposer. A lens array is configured to align the optical waveguide portion.

According to yet another aspect, the optical bench has a second concave portion for the lens array formed thereon, wherein optical waveguide portion is made of a flexible material. The interposer is attached on the first concave portion of the optical bench by using an adhesive material.

The vertical thickness of the V-shape trench is larger than that of the optical waveguide portion. A conductive trace is formed on the interposer to couple the at least one optical element.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
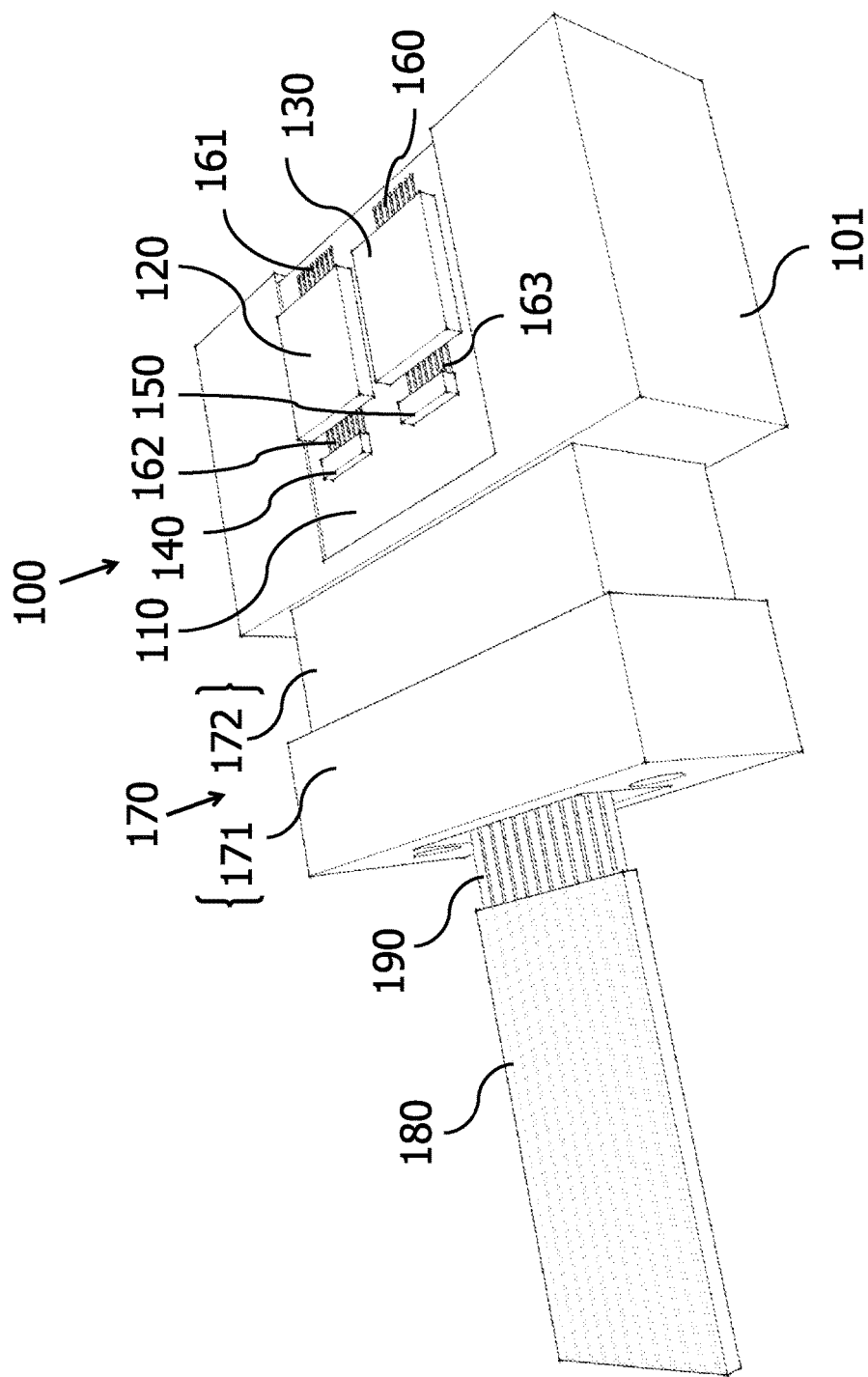
FIG. 1 illustrates a schematic perspective view showing a photoelectric conversion assembly according to an embodiment of the invention.

FIG. 1 illustrates a schematic perspective view showing photoelectric conversion assembly according to an embodiment of the invention. The photoelectric conversion assembly comprises a photoelectric conversion component/module 100, an optical fiber component 180, and an optical ferrule 170, wherein the photoelectric conversion component/module 100 may be used for unidirectional transmission or bidirectional transmission. The photoelectric conversion component/module 100 may be applied to a high speed transmission interface, such as USB, HDMI, Lighting or Thunderbolt interface, for cable line consumer products, or applied to a transmission interface, such as storage BUS including Fiber Channel (FC), SAS, PCIe or SATA, for photoelectric products or equipment. In one embodiment, the photoelectric conversion module 100 may be as an optical transmitter or an optical receiver, for unidirectional transmission. In another embodiment, the photoelectric conversion module 100 may be as an optical transceiver for bidirectional transmission. The photoelectric conversion component/module 100 comprises an optical bench 101 and an interposer 110. In one embodiment, optical elements are configured on the interposer 110, for example a light source chip 140, and a light receiving element 150, such as a photo diode, a photo detector chip or a photosensitive chip configured on the interposer 110. In one embodiment, ICs 120, 130 are configured on the interposer 110, for example a driver integrated circuit (IC), a control IC or a transimpedance amplifier (TIA) chip, or others active components, configured on the interposer 110. Moreover, passive electronic components may be configured on the interposer 110. In one embodiment, ICs 120, 130, passive electronic components may be configured on an external printed circuit board. Conductive trace 160, 161, 162 and 163 are configured on the interposer 110. In one example, the light source chip 140, the light receiving element 150 and ICs 120, 130 are packaged on the interposer 110 by a flip-chip mounting process. The conductive trace 160, 161 on the interposer 110 may be electrically connected to outer circuits, for example by wire bonding. The conductive trace 162 on the interposer 110 is electrically connected to the light source chip 140 and ICs 120, and conductive trace 163 on the interposer 110 is electrically connected to the light receiving element 150 and ICs 130. Material of the interposer 110 comprises silicon, silica, ceramic, or dielectric material, or the interposer 110 is flexible print circuit (FPC) as a substrate. In one embodiment, the optical bench 101 is fabricated by using an injection molding process, such as plastic injection molding process, to form a platform for supporting the interposer 110 and lens array for light focusing. The lens array may be used to improve efficiency of optical usage and increase allowable value of optical package.

In one embodiment, optical fiber component 180 is an optical ribbon fiber or bundle fiber. The optical ribbon fiber 180 has optical fibers 190 inserted into receiving holes or bores of the optical ferrule 170 for electrically coupling to optical elements configured on the interposer 110. The optical fibers 190 are inserted into the optical ferrule 170 for coupling/connecting (engaging) to the photoelectric conversion module 100. The receiving holes or bores are generally cylindrical. For example, the optical fibers 190 are multi-mode fibers or single mode fiber. The optical fibers 190 aligned in series are multimode fibers that are included in the optical ribbon fiber 180. Each of the optical fibers 190 has a core formed at a center thereof, a cladding surrounding the core, and a coating layer coated on an outer surface of the cladding in order to protect the core and the cladding, wherein reflective index (n) of the core is 1.35~1.70 and reflective index of the cladding is 1.35~1.70. The optical fibers 190 are for example 50/125, 62.5/125, or 80/125 graded index (GI) multimode fibers.

In one embodiment, the optical ferrule 170 includes a fiber connecting portion 171 and an optical bench connecting portion 172. The optical ferrule 170 may be as a joint of external optical transmission medium (optical fiber). The receiving holes or bores extend through from the front surface of the fiber connecting portion 171 to the rear surface of the optical bench connecting portion 172. In one embodiment, the fiber connecting portion 171 and the optical bench connecting portion 172 may be integrally fabricated.

Figure 5:
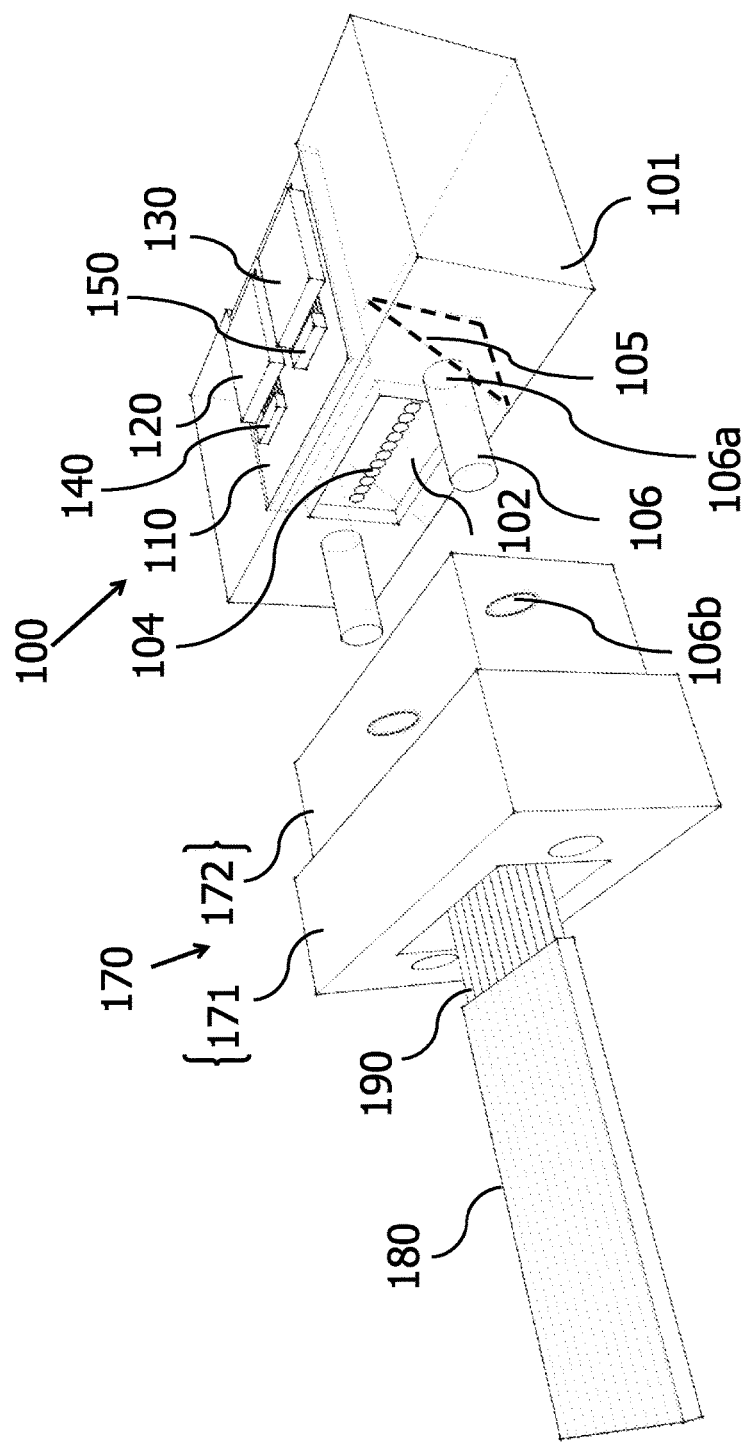
FIG. 5 illustrates a perspective view showing the photoelectric conversion assembly according to one embodiment of the invention.

The optical bench connecting portion 172 includes a mating recess (guide holes) 106b formed therein for receiving the guide pins 106. The optical bench 101 also includes a mating recess (guide holes) 106a formed therein for receiving the guide pins 106. As depicted in FIG. 5, a mating portion (guide pins) 106 may be engaged into the mating recess (guide holes) 106b of the optical bench connecting portion 172 and the mating recess (guide holes) 106a of the optical bench 101, shown in FIG. 5. In the depicted FIG. 5, the guide holes 106a are located adjacent sides of the lens array 104 of the optical bench 101. In one embodiment, the guide holes 106b extend through the optical bench connecting portion 172, or through the front surface of the fiber connecting portion 171 to the rear surface of the optical bench connecting portion 172. The guide holes 106a and 106b may be alignment holes configured to receive the guide pins 106 to facilitate aligning and connecting the optical bench connecting portion 172 (optical ferrule 170) and the optical bench 101 (photoelectric conversion module 100) when the guide pins 106 matches a pair of guide holes 106a and 106b.

In one embodiment, length of the multi-channel fiber connecting portion 171 is less 10 mm (minimeters), thickness of the multi-channel fiber connecting portion 171 is less 3 mm, and width of the multi-channel fiber connecting portion 171 is less 5 mm. Thus, the multi-channel fiber connecting portion 171 of the invention has smaller size than prior arts.

Figure 2:
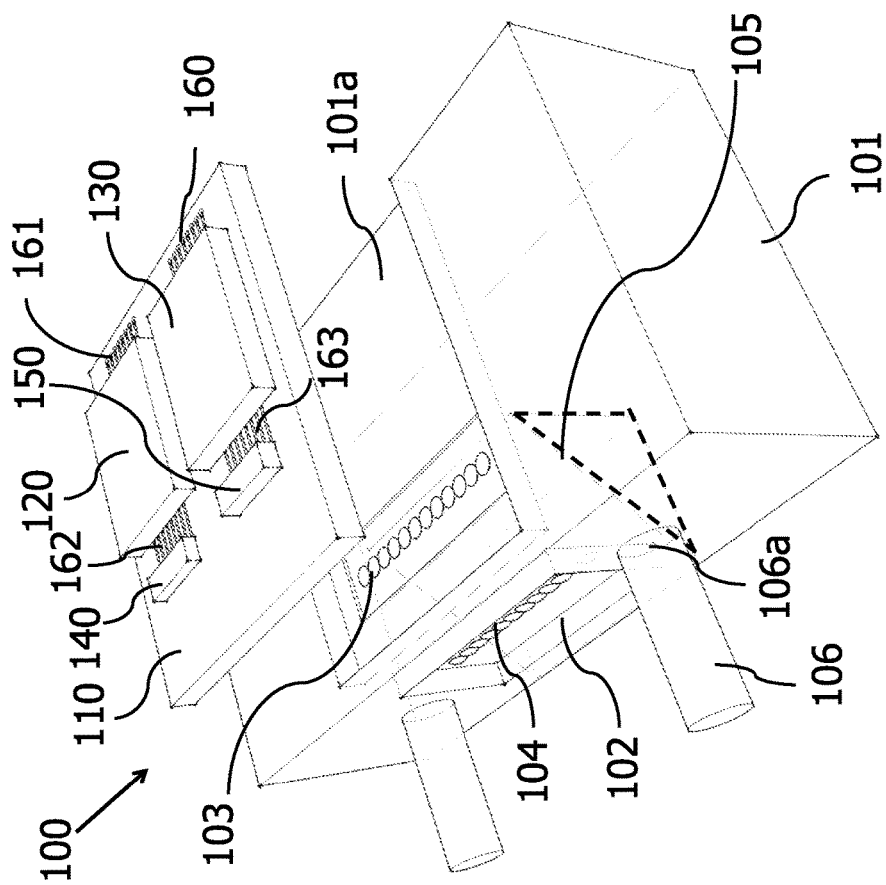
FIG. 2 illustrates a perspective view showing an interposer and an optical bench of the photoelectric conversion module according to an embodiment of the invention.
Figure 3:
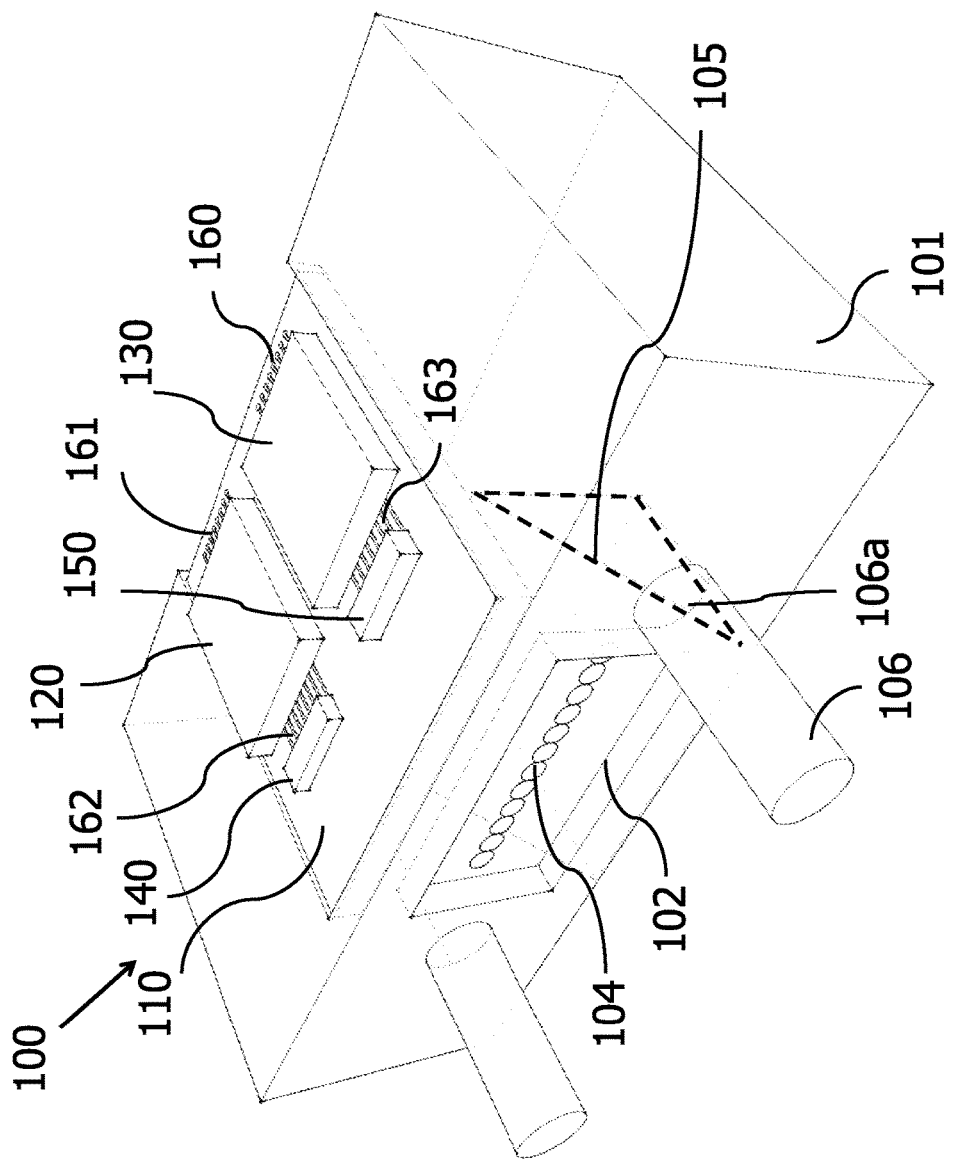
FIG. 3 is a perspective view showing the photoelectric conversion module according to an embodiment of the invention.

FIG. 2 illustrates a perspective view showing the photoelectric conversion module 100 with double sides lens array. The photoelectric conversion module 100 has the interposer 110 and the optical bench 101 with doubles sides lens array 103, 104. In one embodiment, arrangement orientation of the lens array 103 is the same as the lens array 104. The optical bench 101 has a concave portion 101a for the interposer 110 configured/fixed thereon, and the concave portion 101a locates upper side of the interposer 110. The optical bench 101 has another concave portion 102 which locates front side of the optical bench 101, for the lens array 104 formed thereon. In one embodiment, the lens array 103, 104 and the mirror 105 are embedded (integrated) into the optical bench 101. A mirror or reflector 105 is integrated into the optical bench 101. The interposer 110 may be attached on the concave portion 101a of the optical bench 101 by using an adhesive material, such as epoxy, shown in FIG. 3.

The mirror or reflector 105 is passively for optical signal excited by the light source chip 140 to be non-coplanar turning (optical reflection), and the optical signal is guided to the external optical transmission medium, such as optical fibers 190. Conversely, optical signals through an external optical transmission medium (optical fibers 190) are non-coplanar turning by the mirror 105 to guide the optical signals to be received by the light receiving element 150. The mirror 105 can be fabricated to directly integrate into the optical bench 101 or the interposer 110.

Figure 4:
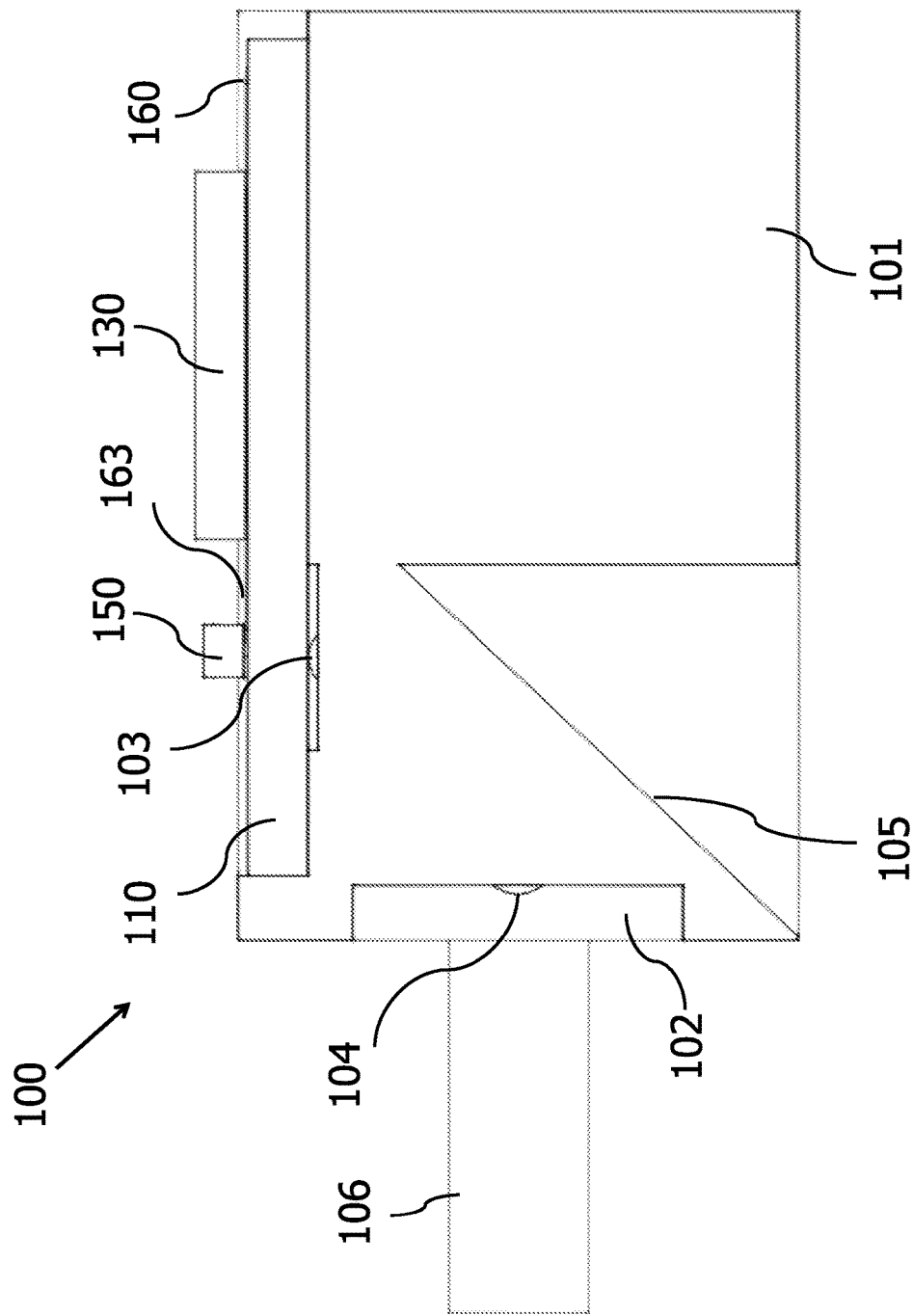
FIG. 4 illustrates a cross-sectional view showing the photoelectric conversion module according to one embodiment of the invention.

As shown in FIG. 4, the lens array 103 is formed on (under) the bottom surface (platform) of the concave portion 101a of the optical bench 101, aligning optical elements (light source chip 140 and light receiving element 150) on the interposer 110 when the interposer 110 is attached on the concave portion 101a of the optical bench 101. The lens array 103 locates under the interposer 110. The lens array 104 is formed on (under) the bottom surface of the concave portion 102 of the optical bench 101. The mirror 105 locates under the lens array 103 and locates right side of the lens array 104. The light source chip 140 emits light passing through the interposer 110 and the lens array 103, and reflecting by the mirror 105 to the lens array 104 for focusing the emitted light and propagating to the external transmission medium (optical fibers 190), shown in FIG. 4. On the other hand, light created by the external device feeds into the optical fibers 190, passing through the lens array 104 to form an approximately collimated light and reflecting by the mirror 105 to pass through the lens array 103 and the interposer 110, and thereby receiving the inputted light by the light receiving element 150, shown in FIG. 5.

The rear ends of the plural optical fibers 190 are fixed to an end of the optical bench connecting portion 172 of the optical ferrule 170. The photoelectric conversion module 100 has a function of converting an optical signal (via the plural optical fibers 190) from external electrical apparatus or equipment into an electrical signal, or transmitting an optical signal to the external electrical apparatus or equipment via the plural optical fibers 190.

Figure 6:
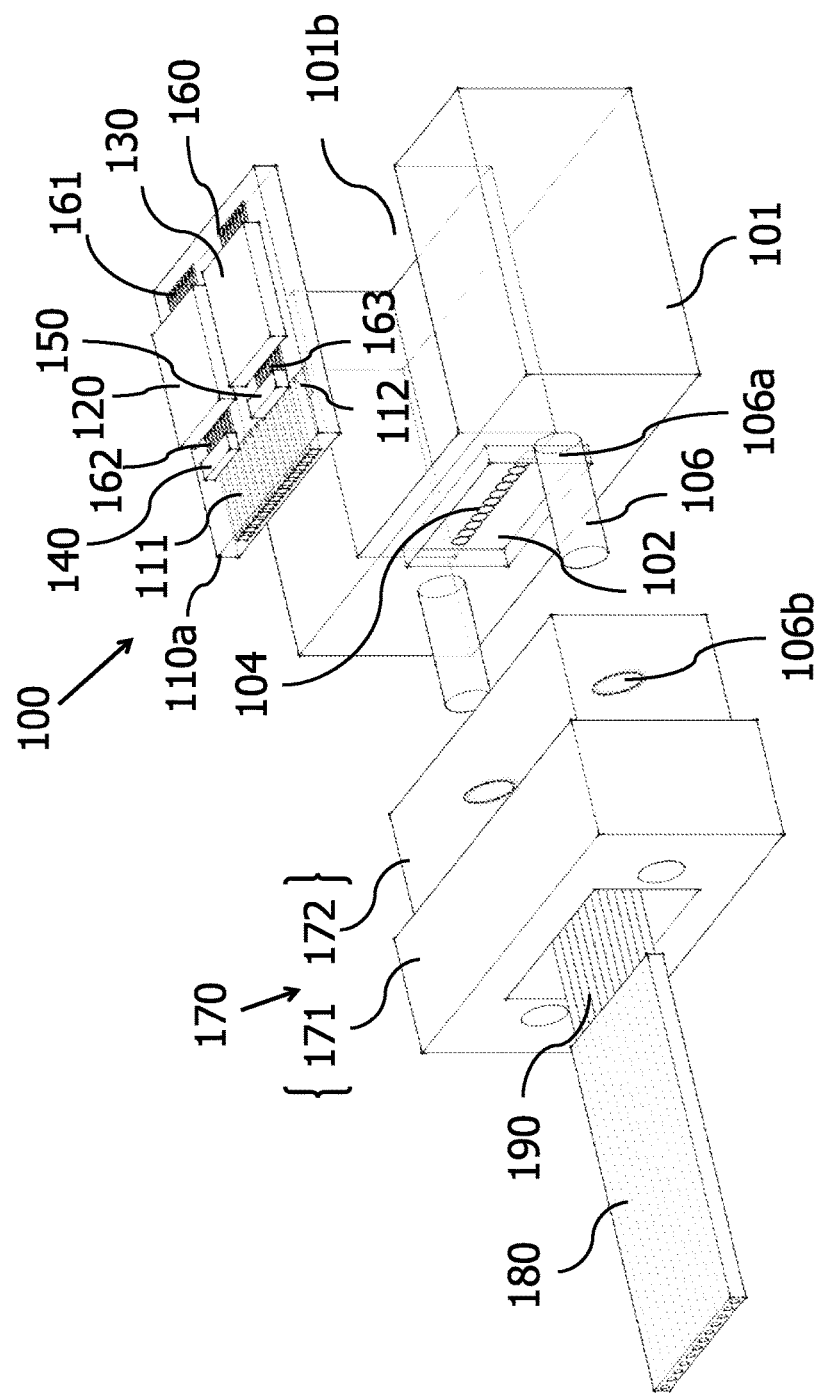
FIG. 6 illustrates a perspective view showing a photoelectric conversion assembly according to another embodiment of the invention.

In another embodiment, the photoelectric conversion module 100 has the interposer 110a and the optical bench 101. The interposer 110a has an optical waveguide portion 111 and a mirror 112, and the optical bench 101 has a single lens array 104, shown in FIG. 6. The optical bench 101 has a concave portion 101b for the interposer 110a configured/fixed thereon, and the concave portion 101b locates upper side of the interposer 110a. The optical bench 101 has another concave portion 102 which locates front side of the optical bench 101. The optical waveguide portion 111 and the mirror 112 are integrated into the interposer 110a. The optical waveguide portion 111 is made of a flexible material, such as polymer. The optical waveguide portion 111 is used as an optical waveguide. The interposer 110a has a concave structure 113, such as V-shape trench, with an optical micro-reflection surface (mirror) 112 at one side of (within) V-shape trench 113 and rear side of the optical waveguide portion 111, shown in FIG. 7. The mirror 112 locates under the light source chip 140 and photo diode chip (PD chip) 150 for reflecting optical signals from the light source chip 140 or the optical fibers 190. The mirror 112 has a specified angle (such as 45 degree angle or other degree angle). V-shape trench 113 of the interposer 110a has a specified depth (vertical thickness). The first end of the V-shape trench 113 of the interposer 110a forms a reflection surface. The V-shape trench 113 has a first slant plane and a second slant plane, wherein the first slant plane is opposite to the second slant plane. Vertical thickness of the V-shape trench 113 is larger than that of the optical waveguide portion 111, and the V-shape trench 113 is passing through the optical waveguide portion 111. V-shape trench 113 may be formed by an imprinting process, a wedge cutting process or a laser cutting process. Light source chip 140 and photo diode chip (PD chip) 150 are packaged on the interposer 110a. The ICs 120, 130 may be electrically connected to the external devices via the metal trace 161, 160 by wire bond or flip board mounting.

In one embodiment, ICs are, for example a driver integrated circuit (IC), a control IC or a trans-impedance amplifier (TIA) chip, or others active components, configured on the interposer. The driver IC may be used to drive the light source chip (such as optoelectronic device) for emitting light. In this embodiment, the interposer 110a has waveguide function used for guiding light. The interposer 110a comprises an optical waveguide portion 111, such as polymer, embedded into the interposer 110a. In one embodiment, the interposer 110a is a flexible substrate.

Figure 7:
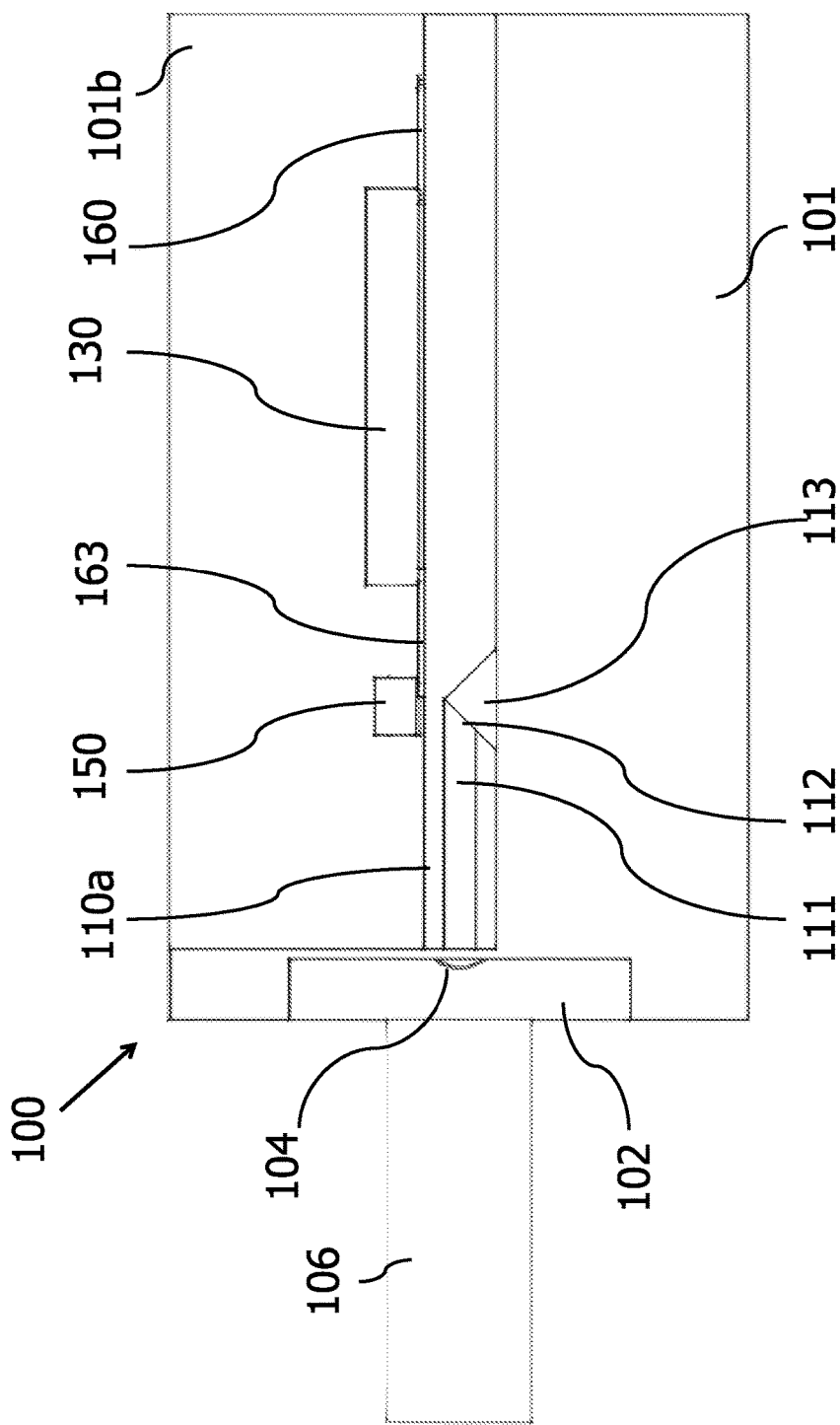
FIG. 7 illustrates a photoelectric conversion module according to another embodiment of the invention.

The optical waveguide portion 111 aligns to the lens array 104 for optical communication, shown in FIG. 7. Such structure may receive and transmit optical signal through the optical waveguide portion 111. Light created by the light source chip 140 may be reflected via the optical micro-reflection surface 112 at one side of the optical waveguide portion 111. The optical waveguide portion 111 is allowable for optical path penetrating therein, for facilitating light emitted from the light source chip 140 or coming from external devices passing through therein. The light source chip 140 is capable of emitting visible and invisible light. The light source chip 140 is for example a laser, infrared light or a light emitting diode (LED). Infrared light is in infrared band, which can be emitted by laser or LED.

For example, the light source chip 140 and the photo detector 150 are arranged in the vicinity of the optical micro-reflection surface 112. Therefore, optical signal emitted by the light source chip 140 is reflected by the optical micro-reflection surface 112 of the V-shape trench 113 and then passing through the flexible waveguide portion 111.

Material and thickness of the flexible waveguide portion 111 may be selected, based-on requirements for practical applications. For example, material of the flexible waveguide portion 111 includes polymer material, dielectric material, such as polyimide.

Figure 8:
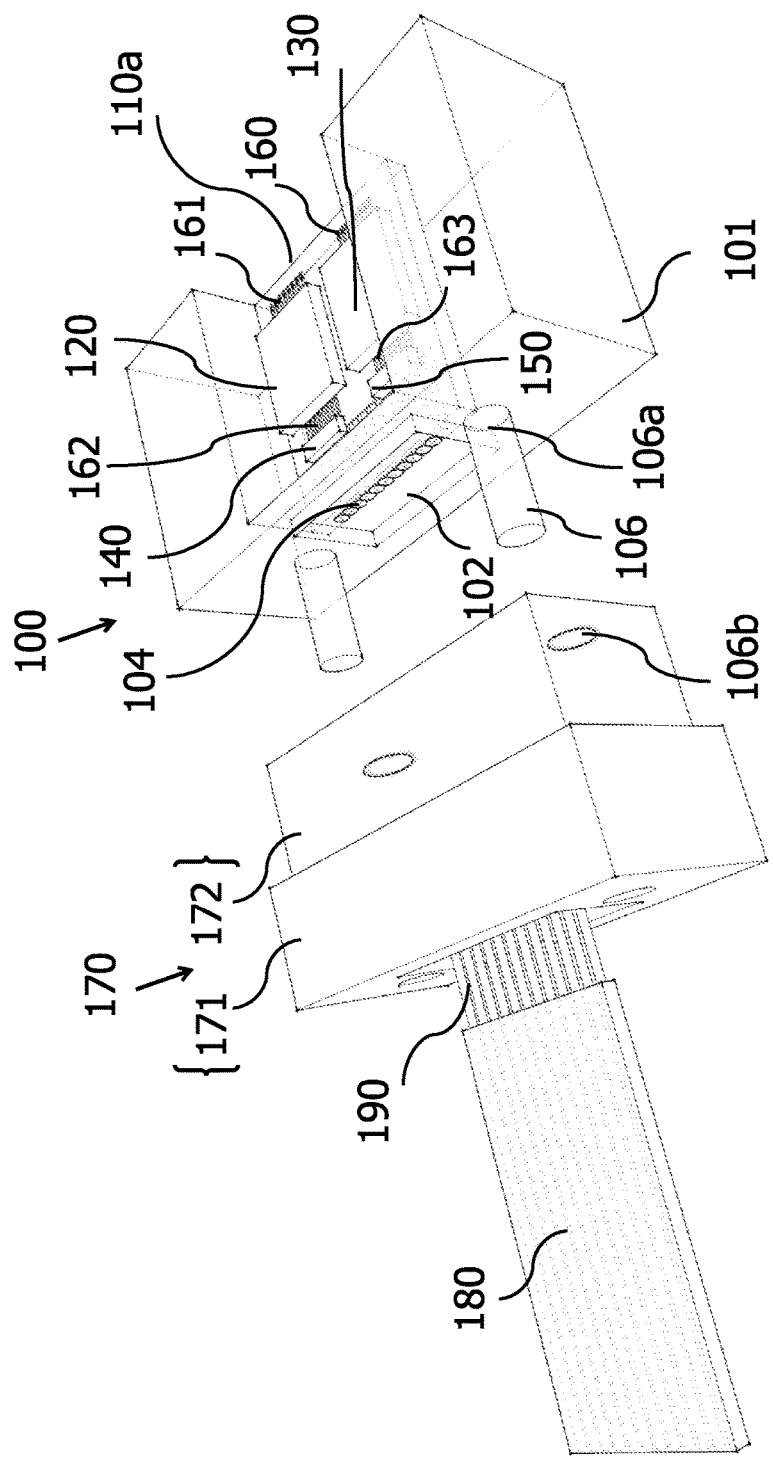
FIG. 8 illustrates the photoelectric conversion assembly according to another embodiment of the invention.

The interposer 110a may be attached on the concave portion 101b of the optical bench 101 by using an adhesive material, such as epoxy, shown in FIG. 7 and FIG. 8. ICs 120, 130 are electrically connected to the external apparatus or equipment for signal connection via the conductive trace 161, 160 of the interposer 110a. V-shape trench 113 faces the top surface of the optical bench 101 within the concave portion 101b when the interposer 110 is attached on the optical bench 101.

The conductive trace on the interposer may be electrically connected to ICs or the circuit board by wire bond or flip board for signal connection.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A photoelectric conversion module, comprising:
   an interposer;
   at least one optical element configured on said interposer;
   an optical bench having a first concave portion for said interposer configured thereon;
   a first lens array configured under said interposer to align said at least one optical element;
   a mirror configured under said first lens array, with an optical micro-reflection surface; and
   a second lens array configured left side of said mirror.

2. The photoelectric conversion module of claim 1, wherein said optical bench has a second concave portion for said second lens array formed thereon.

3. The photoelectric conversion module of claim 1, wherein said first lens array is formed on a bottom surface of said first concave portion.

4. The photoelectric conversion module of claim 1, wherein arrangement orientation of said first lens array is the same as said second lens array.

5. The photoelectric conversion module of claim 1, wherein said first lens array, said second lens array and said mirror are embedded into said optical bench.

6. The photoelectric conversion module of claim 1, wherein said at least one optical element is a light source chip, a photo diode chip, a photo detector chip or a photo-sensitive chip.

7. The photoelectric conversion module of claim 1, further comprising a conductive trace formed on said interposer to couple said at least one optical element.

8. The photoelectric conversion module of claim 1, further comprising at least one IC formed on said interposer.

9. The photoelectric conversion module of claim 8, wherein said at least one IC is a driver integrated circuit (IC), a control IC or a trans-impedance amplifier (TIA) chip.

10. The photoelectric conversion module of claim 1, wherein said interposer is attached on said first concave portion of said optical bench by using an adhesive material.

11. A photoelectric conversion module, comprising:
    an interposer with an optical waveguide portion and V-shape trench having a first optical micro-reflection surface and a second optical micro-reflection surface opposite to said first optical micro-reflection surface;
    at least one optical element configured on said interposer;
    an optical bench having a first concave portion for said interposer configured thereon; and
    a lens array configured to align said optical waveguide portion.

12. The photoelectric conversion module of claim 11, wherein said optical bench has a second concave portion for said lens array formed thereon.

13. The photoelectric conversion module of claim 11, wherein said optical waveguide portion is made of a flexible material.

14. The photoelectric conversion module of claim 11, wherein said interposer is attached on said first concave portion of said optical bench by using an adhesive material.

15. The photoelectric conversion module of claim 11, wherein vertical thickness of said V-shape trench is larger than that of said optical waveguide portion.

16. The photoelectric conversion module of claim 11, further comprising a conductive trace formed on said interposer to couple said at least one optical element.

17. The photoelectric conversion module of claim 11, wherein said at least one optical element is a light source chip, a photo diode chip, a photo detector chip or a photo-sensitive chip.

18. The photoelectric conversion module of claim 11, further comprising at least one IC formed on said interposer.

19. The photoelectric conversion module of claim 18, wherein said at least one IC is a driver integrated circuit (IC), a control IC or a trans-impedance amplifier (TIA) chip.

20. The photoelectric conversion module of claim 18, wherein said at least one IC is coupled to a conductive trace formed on said interposer.

* * * * *